(No Model.) 2 Sheets—Sheet 1.
W. L. GROUT & E. L. BOWERS.
MACHINE FOR DRILLING METAL BLANKS.
No. 333,461. Patented Dec. 29, 1885.
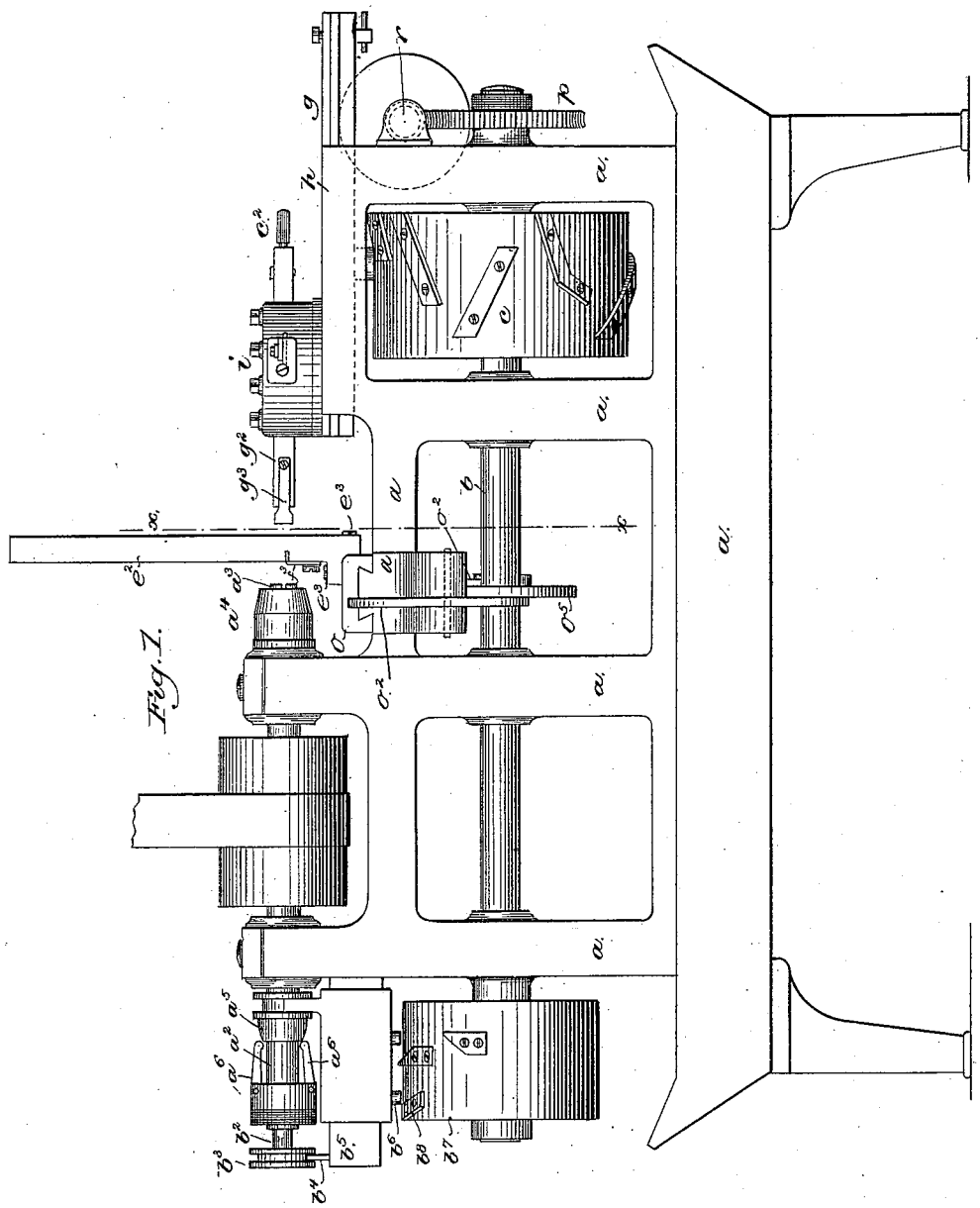
Witnesses.
John F. C. Primlerk.
Arthur Zipperlen.
Inventors
William L. Grout.
Edward L. Bowers.
by Cearty & Gregory attys.

(No Model.) 2 Sheets—Sheet 2.
W. L. GROUT & E. L. BOWERS.
MACHINE FOR DRILLING METAL BLANKS.
No. 333,461. Patented Dec. 29, 1885.
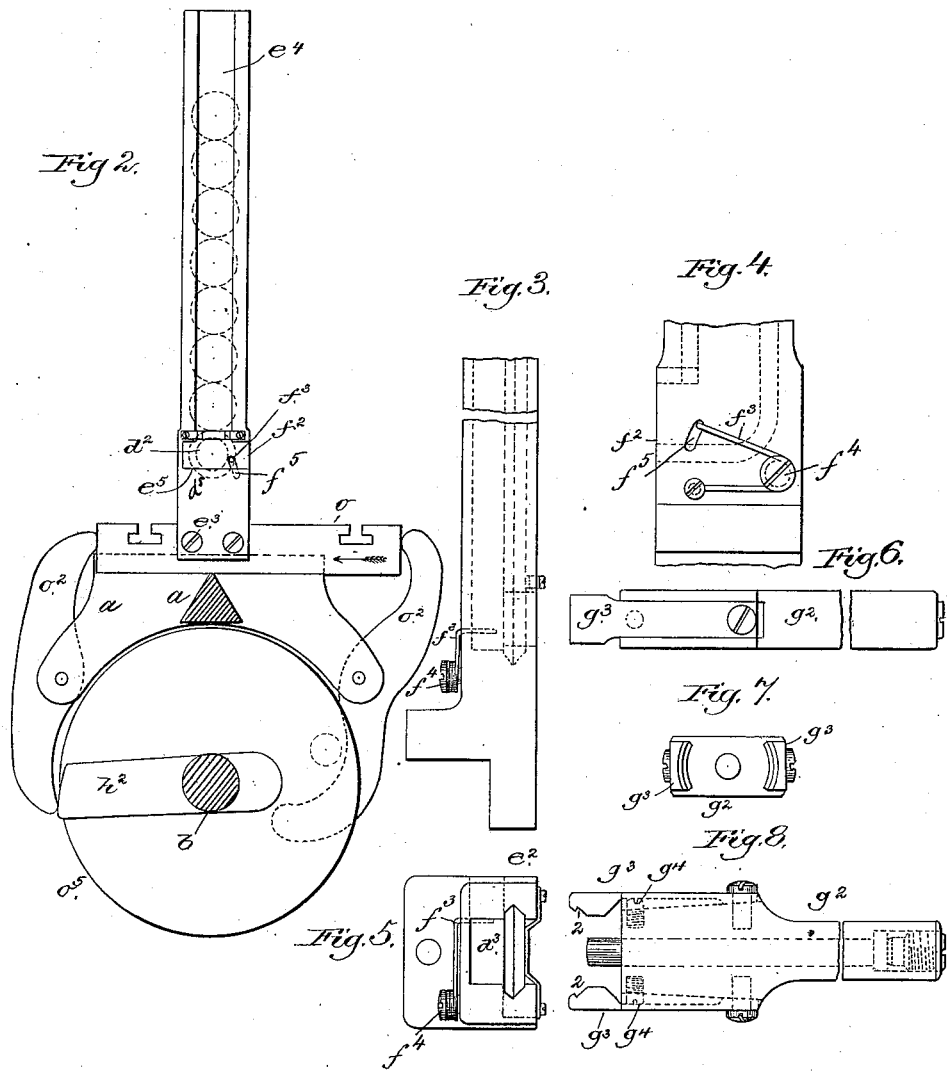

UNITED STATES PATENT OFFICE.

WILLIAM L. GROUT AND EDWARD LUTHER BOWERS, OF ORANGE, MASS.

MACHINE FOR DRILLING METAL BLANKS.

SPECIFICATION forming part of Letters Patent No. 333,461, dated December 29, 1885.

Application filed September 7, 1885. Serial No. 176,352. (No model.)

*To all whom it may concern:*

Be it known that we, WILLIAM L. GROUT, and EDWARD L. BOWERS, both of Orange, county of Franklin, and State of Massachusetts, have invented an Improvement in Machines for Drilling Metal Blanks, of which the following description, in connection with the accompanying drawings, is a specification, like letters on the drawings representing like parts.

This invention has for its object the production of a machine whereby metal blanks for bevel-gears, pinions, &c., may be drilled, the blanks being presented automatically.

In accordance with this invention the blanks to be drilled are placed in a magazine open at one side near its lower end, and mounted on a cross-slide, and jaws mounted on the usual turret or tool-carrier engage the blank and hold it while the magazine is moved laterally, thus effecting the removal of the blank laterally through the side of the magazine, and thereafter the jaws, by a movement of the carriage and turret, place the blank in a chuck connected with a rotating spindle, the chuck rotating the blank while the carriage and turret are operated to bring the boring-tool into position to effect the boring of the blank.

Our invention in machines for drilling gear and other blanks consists, essentially, in a magazine slotted or cut out at its lower end for the withdrawal of the blank, a reciprocating cam-slide to carry the said magazine, and a pair of jaws to grasp and hold the said blank while the magazine is moved out of line with relation to the spindle and chuck, combined with a chuck and spindle to grasp and rotate the blank, and with a tool to bore the blank, substantially as will be described.

Figure 1 represents a side elevation of a machine containing our invention. Fig. 2 is a section in the line $x\,x$, Fig. 1, looking toward the left; Fig. 3, an enlarged elevation of a part of the magazine; Fig. 4, an enlarged detail of the lower end of the magazine; Fig. 5, a top view of part shown in Fig. 3. Fig. 6 is a side elevation of the jaws for taking the blank from the magazine; Fig. 7, a front end view thereof; and Fig. 8, a top or plan view of parts shown in Fig. 6.

We have shown our invention as applied to the frame of what is called the "Hartford Screw-Machine," the same being substantially as represented in United States Patent No. 223,255, dated January 6, 1880. The frame-work $a$, the main shaft $b$, the cam-carrying hub $c$, the cam-disk $o^5$, the cross-slide $o$, the levers $o^2$ to move the said cross-slide, the sliding carriage $g$, the guideways $h$, the worm-toothed gear $p$, the shaft $r$, and the turret $i$ are all substantially as in the said patent. The spindle $a^2$, made hollow to receive the jaws $a^3$ of the chuck, and the head $a^4$, sliding conical collar $a^5$, and levers $a^6$, operated thereby to effect the opening and closing of the chuck, are of usual construction and not of our invention.

The hollow shaft forming part of the chuck contains a rod, $b^2$, which is extended forward well into the chuck. This rod has at its rear end an annularly-grooved hub, $b^3$, which is entered by a finger, $b^4$, of a slide, $b^5$, having a pin, $b^6$, which is acted upon at suitable times by cams arranged on the hub $b^7$, attached to the main shaft $b$, the said cams being so arranged as to cause the slide $b^5$ to be moved forward at the proper time, as when it is desired to eject from the opened jaws of the chuck the gear or other blank which has been bored or drilled, a suitable cam thereafter moving the slide $b^5$ and rod $b^2$ back into the position shown in Fig. 1, the cam $b^8$ in such figure being about to commence to act upon the pin $b^6$. The turret $i$ has projecting radially from it a drill, $c^2$, by which to bore the hub or center of the gear or other blank $d^2$, while the latter is held between the jaws of the chuck.

Upon the cross-slide $o$ we have erected a magazine, $e^2$, the same being attached thereto by screws $e^3$. This magazine is a vertical bar or piece of metal grooved from its upper end downward, as at $e^4$, to receive the gears or other blanks $d^2$, which are dropped therein one after the other to more or less fill the said magazine, as shown by dotted lines, Fig. 2, the lowermost blank resting upon the shoulder $d^5$. This magazine, near its lower end, and substantially in line with the lowermost blank therein, has one of its walls cut through, leaving a lateral passage or outlet, $f^2$, through which the gear or other blank may be taken laterally, as will be described. The lower end of the magazine is provided with a spring, $f^3$, attached by a screw, $f^4$, the end of the sprin working in a slot, $f^5$, and acting to retain th lowermost gear or other blank in place until it is desired to take the gear or other blank from the magazine. The turret $i$, rotated in usual manner common to ordinary turret lathes, has attached to it a rod, $g^2$, having two spring-jaws, $g^3$, which may be made to approach each other more or less closely by adjusting the adjusting-screws $g^4$. (See Fig. 8.) These jaws have notches 2 2 of suitable shape to engage the jaws of the gear or other blank to be taken from the magazine.

The main shaft $b$ is provided with suitable cams or projections, $h^2$, attached to the disk $o^5$, to operate upon the levers $o^2$ $o^2$ to move the cross-slide $o$ with its attached magazine in one and then in the opposite direction at the proper time. Normally the position of the cross-slide $o$ and its attached magazine is at one side of the center of rotation of the chuck and its spindle; but just before a gear or other blank, $d^2$, is to be taken from the magazine, the lever $o^2$ at the left of Fig. 2 will be operated to move the cross-slide $o$ and place the magazine in line with the jaw $g^3$, and the carriage $g$ will then be moved forward far enough to spring the jaw $g^3$ over the opposite side of the gear or other blank $d^2$ to be taken from the magazine, the ends of the said jaws passing through an opening made in the side of the magazine next toward the turret. The jaws having grasped the gear or other blank $d^2$ between its members the lever $o^2$, at the right of Fig. 2, will be operated to move the cross-slide $o$ in the direction of the arrow thereon in said figure, such movement taking place while the jaw yet grasps the gear or other blank, and as a result the magazine is carried away from the jaws laterally, and the gear or other blank is made to pass laterally out through the opening $f^2$. In this condition of the machine the carriage $g$ is moved forward another step by a suitable cam-block on the hub $c$, and the jaws $g^3$ insert the gear or other blank held between them into the chuck $a^3$, which at that time is open, and immediately afterward the levers $a^6$, which are effective to close the chuck are operated to cause the chuck to grasp and hold the gear or other blank, the rotation of the spindle thereafter rotating the gear or other blank in unison with it. After delivering the gear or other blank into the chuck the carriage $g$ is retracted, the jaws $g^3$ yield and are drawn off from the gear or other blank, the turret is rotated sufficiently to place in operative position the tool carried by it which is to be used to bore or act upon the gear or other blank, and thereafter the carriage is moved forward and its tool is presented to and made to act upon the revolving gear or other blank, boring a hole through the same or its hub.

We claim—

1. In a machine for drilling gear and other blanks, a magazine slotted or cut out at its lower side for the withdrawal therefrom of a blank, the reciprocating cross-slide to carry the said magazine, means to move it, and a pair of jaws to grasp and hold the said blank while the magazine is moved out of line with relation to the center of rotation of the spindle and chuck, combined with a chuck and spindle to grasp the rotating blank, and with a tool to bore the blank, substantially as described.

2. In a machine for drilling gear and other blanks, the magazine slotted or cut out at its lower side for the withdrawal therefrom of a blank, and the reciprocating cross-slide to carry the said magazine, and means to move it, combined with a pair of jaws to grasp and hold the said blank while the magazine is moved out of line with relation to the center of rotation of the spindle, substantially as described.

In testimony whereof we have signed our names to this specification in the presence of two subscribing witnesses.

WILLIAM L. GROUT.
EDWARD LUTHER BOWERS.

Witnesses:
EDW. M. BUELL,
G. P. FIELD.